US007896261B2

(12) United States Patent
Holmes

(10) Patent No.: US 7,896,261 B2
(45) Date of Patent: Mar. 1, 2011

(54) WATER DISTRIBUTION SYSTEM

(76) Inventor: Tony Holmes, Wangi Wangi (AU)

( * ) Notice: Subject to any disclaimer, the term of this patent is extended or adjusted under 35 U.S.C. 154(b) by 89 days.

(21) Appl. No.: 10/788,051

(22) Filed: Feb. 25, 2004

(65) Prior Publication Data
US 2004/0195828 A1 Oct. 7, 2004

(30) Foreign Application Priority Data

Mar. 14, 2003 (AU) ................................ 2003901160
Sep. 2, 2003 (AU) ................................ 2003904785

(51) Int. Cl.
B05B 1/14 (2006.01)
F16L 41/02 (2006.01)

(52) U.S. Cl. ............. 239/565; 239/205; 239/207; 285/5; 285/129.1; 285/132.1

(58) Field of Classification Search ................ 285/5, 12, 285/130.1, 131.1, 132.1, 125.1, 129.1, 133.11; 239/273, 276, 266, 565, 203–207, 267; 137/561 A
See application file for complete search history.

(56) References Cited

U.S. PATENT DOCUMENTS

| | | | | | |
|---|---|---|---|---|---|
| 1,387,256 | A | * | 8/1921 | Griffin | 239/736 |
| 2,302,040 | A | * | 11/1942 | Lyndon | 239/230 |
| 2,310,796 | A | * | 2/1943 | Lappin | 239/230 |
| 2,567,165 | A | * | 9/1951 | Buskirk | 285/125.1 |
| 2,706,134 | A | * | 4/1955 | Wilson et al. | 239/204 |
| 2,755,985 | A | * | 7/1956 | Finegan | 239/267 |
| 2,793,911 | A | * | 5/1957 | Dudley | 285/98 |
| 2,878,062 | A | * | 3/1959 | Crow | 239/228 |
| 2,968,440 | A | * | 1/1961 | Cone | 239/203 |
| 2,975,983 | A | * | 3/1961 | Niebling | 239/126 |
| 3,006,558 | A | * | 10/1961 | Jacobs | 239/267 |
| 3,067,950 | A | * | 12/1962 | Goldman | 239/276 |
| 3,239,149 | A | * | 3/1966 | Lindberg, Jr. | 239/203 |
| 3,379,380 | A | * | 4/1968 | McGivern | 239/254 |
| 3,385,525 | A | * | 5/1968 | Jacobs | 239/394 |
| 3,424,178 | A | * | 1/1969 | Yoshimi | 135/157 |
| 3,425,632 | A | * | 2/1969 | Stout | 239/267 |
| 3,726,477 | A | * | 4/1973 | Shapiro | 239/70 |
| 3,735,928 | A | * | 5/1973 | Watts et al. | 239/267 |
| 3,736,955 | A | * | 6/1973 | Schlesser | 137/561 A |
| 3,831,681 | A | * | 8/1974 | Livingston | 169/16 |
| 3,831,983 | A | * | 8/1974 | Stickler | 285/12 |
| 4,078,728 | A | * | 3/1978 | Nordeen | 239/586 |
| 4,135,738 | A | * | 1/1979 | Clements | 285/5 |
| 4,791,993 | A | * | 12/1988 | Curran | 169/16 |
| 5,104,150 | A | * | 4/1992 | Bard et al. | 285/12 |
| 5,257,826 | A | * | 11/1993 | Prassas et al. | 285/148.19 |
| 5,327,976 | A | * | 7/1994 | Hattori | 169/43 |
| 5,385,300 | A | * | 1/1995 | Sims, Jr. | 239/74 |

(Continued)

Primary Examiner — James M Hewitt
(74) Attorney, Agent, or Firm — Chernoff, Vilhauer, McClung & Stenzel

(57) ABSTRACT

A Y-shaped plumbing fitting comprises three generally radially extending tubes connected together for transmission of fluid therebetween. The radially outward end of each tube is terminated by a pipe connector. The axes of the three tubes extend radially in a common plane and intersect at a single point, subtending angles of 120° with each other. A further connector is provided extending substantially perpendicularly to the common plane of the three tubes to connect a fitting to the three tubes. An irrigation system, using the Y-shaped plumbing fitting comprises a network of pipes connected by the "Y" shaped fittings. Each pipe in the network is connected at each end to a leg of a respective Y-shaped fitting such that the pipes each form one side in a hexagonal shaped pipe network formation. Alternate "Y" shaped plumbing fittings are fitted with watering outlets.

5 Claims, 7 Drawing Sheets

U.S. PATENT DOCUMENTS

| | | | |
|---|---|---|---|
| 5,560,542 A * | 10/1996 | Reid | 239/70 |
| 5,879,029 A * | 3/1999 | Wilks | 285/8 |
| 6,036,104 A * | 3/2000 | Shih | 239/63 |
| 6,231,083 B1 * | 5/2001 | Marandi | 285/5 |
| 6,327,860 B1 * | 12/2001 | Critchley | 60/737 |
| 6,340,059 B1 * | 1/2002 | Bethea | 169/37 |
| 6,502,764 B2 * | 1/2003 | Walker | 239/203 |
| 6,547,159 B1 * | 4/2003 | Westby | 239/204 |
| 2004/0074997 A1 * | 4/2004 | Sacks | 239/542 |
| 2005/0035592 A1 * | 2/2005 | Williams | 285/125.1 |
| 2005/0211802 A1 * | 9/2005 | Newton | 239/548 |

* cited by examiner

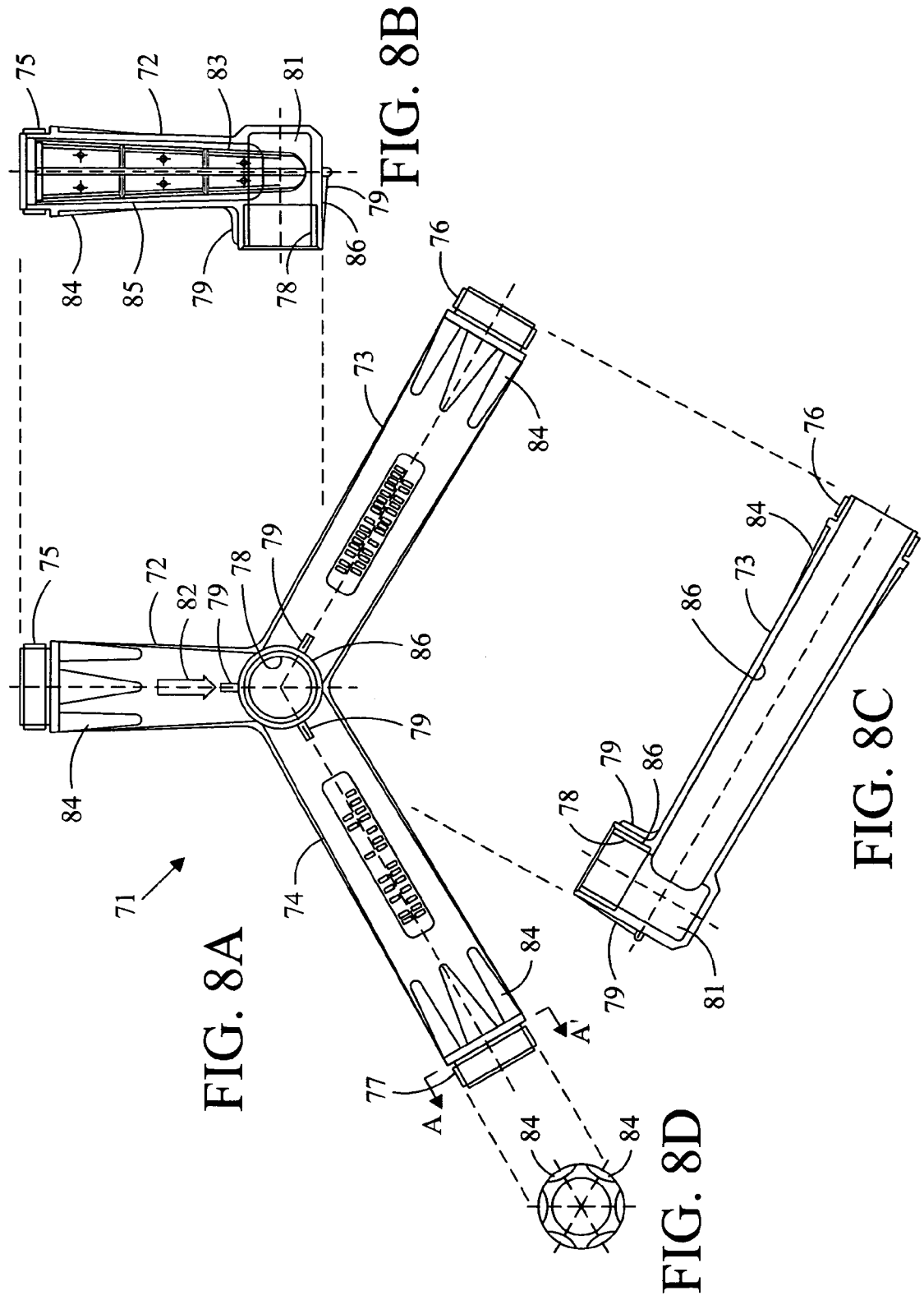

WATER DISTRIBUTION SYSTEM

The present invention relates generally to irrigation systems and in particular the invention provides an improved plumbing fitting and an improved irrigation system design using the fitting.

BACKGROUND TO THE INVENTION

Irrigation and water distribution systems involve careful calculation and design to avoid pressure loss due to friction and other effects when water travels at excessive velocities or changes direction suddenly as would occur at a tee intersection or a 90° elbow. Undesirable effects can occur when these factors are overlooked or given insufficient attention. These effects can include water hammer resulting in broken pipe and fittings and turbulence resulting in flow loss and uneven water distribution from sprinkler outlets in the immediate vicinity of the fitting.

Currently available fittings with outlets such as tees limit the irrigation designer to supplying the sprinkler with water from only one or two directions within a given network design.

Conventional irrigation designs commonly place sprinkler outlets in one of two spacing patterns, square spacing or triangular spacing. Triangular spacing provides advantages in water distribution and is more economical, as sprinkler heads can be spaced at greater distances while providing full coverage and even water distribution when compared with the performance of an installation with square spacing. However, currently triangular spacing designs are achieved by utilising tee fittings and elbow fittings to acquire the required water delivery to the sprinkler with resultant longer pipe runs and higher friction losses.

SUMMARY OF THE INVENTION

According to a first aspect, the present invention provides a plumbing fitting comprising three tubes which extend generally radially and are connected to each other at their respective proximal ends for transmission of fluid therebetween, the radially outward end of each tube being terminated by a pipe connector each having an axis which extends radially in a single common plane with extensions of the axes of each of the pipe connector passing through a single point in said common plane and the axes subtending angles of 120° with each other, and the fitting being provided with a further connector for connection of a further fluid transmitting element, the further connecting means having an axis extending substantially perpendicularly to the common plane of the axes of the three pipe connector. Throughout this specification these fittings are refereed to as "Y" shaped fittings.

It will be recognised by persons skilled in the art that references to specific dimensions, angular measurements and other physical characteristics such as planarism are intended to be read as including variations which occur in the manufacturing process or variations intentionally introduced to avoid the literal reading of the term while not significantly affecting the performance of the end product.

For ease of manufacture the axes of the pipe connector are preferably coaxial with their respective radial tube.

Typically the plumbing fitting will be made of a plastic material such as polyvinyl chloride (PVC), however this is not essential and fittings can be manufactured in other materials common in the plumbing industry such as copper, bronze or cast iron. In one advantageous embodiment of the plumbing fitting, the pipe connecting means comprise slip fittings into which pipes are glued, cemented, soldered braised or welded depending on the material of the fitting and the pipe. In other embodiments the connector may be a male or female thread in one of the standard sizes reserved for plumbing fittings, a bayonet connector or a snap in connector of the types used in hose fittings, or a spigot onto which a hose or pipe may be clamped. Fittings may also have a combination of different types of connector on different ones of the tubes.

The further connector will preferably be a female screw thread for receiving a sprinkler head, a riser tube or a pop-up fitting, in each case with a corresponding male thread. However the further connector may alternatively also have any other type of plumbing connection commonly in use, such as those mentioned above. The further connector is preferably a centrally located threaded outlet on the top of the fitting and is preferably arranged to receive a device of internal diameter equal to or less than the diameter of the devices connected to the connector on the three tubes.

The length of the three tubes may be equal but may also be of varying combinations of length. For example, two tubes may be equal in length and a third tube may be shorter than the other two.

According to a second aspect, the present invention provides an irrigation system comprising a network of pipes connected by "Y" shaped fittings to form an in which each of the pipes (in combination with respective legs of fittings at either end) is of substantially equal length and forms one side in a hexagonal shaped pipe formation, and at least some of the "Y" shaped connectors are fitted with watering outlets.

Preferably the watering outlets are sprinkler heads either directly connected to the "Y" shaped fitting or connected via a riser, or a pop-up fitting.

Typically a sprinkler head will be fitted to every second "Y" shaped fitting in each hexagonal formation such that each hexagonal formation has sprinkler heads on 3 of its corners and sprinkler heads occur on non-adjacent corners. However, other configurations are also possible and sprinklers might be placed on every corner for example.

BRIEF DESCRIPTION OF THE DRAWINGS

Embodiments of the invention will now be described by way of example with reference to the accompanying drawings in which:—

FIG. 8 provides a variety of views of a further embodiment including a top view (FIG. 8a), a partial sectional side view of a first (shorter) tube (FIG. 8b), a sectional side view through a second longer tuber of the fitting (FIG. 8c), and a sectional view of the end of the tube through section (A-A) (FIG. 8d);

DETAILED DESCRIPTION OF EMBODIMENTS
OF THE INVENTION

Figure 1:
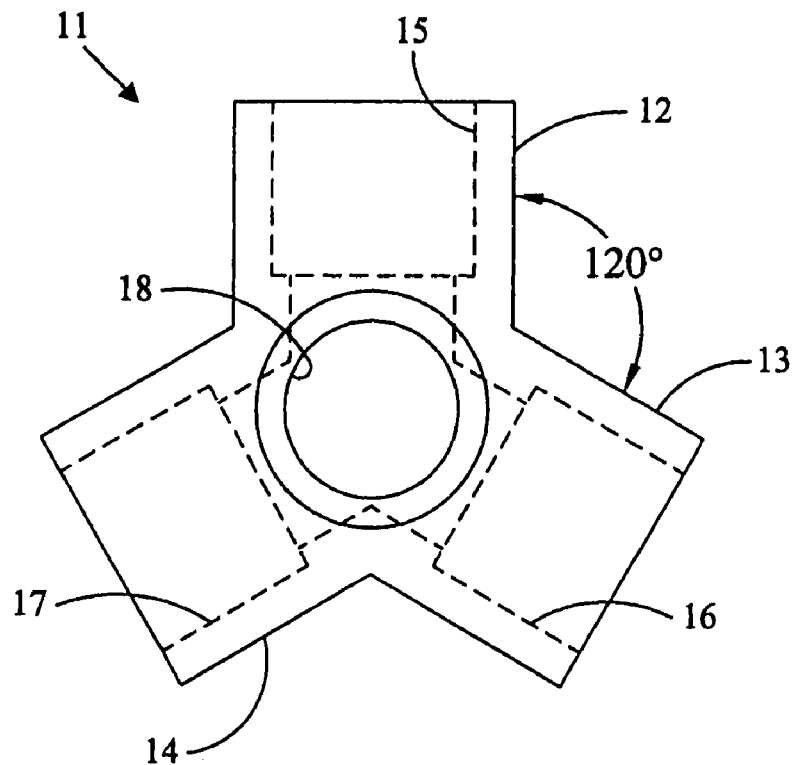
FIG. 1 shows an overhead view of a first embodiment of the invention with slip fittings at the outer ends of each tube for PVC cementing to pipe work.
Figure 2:
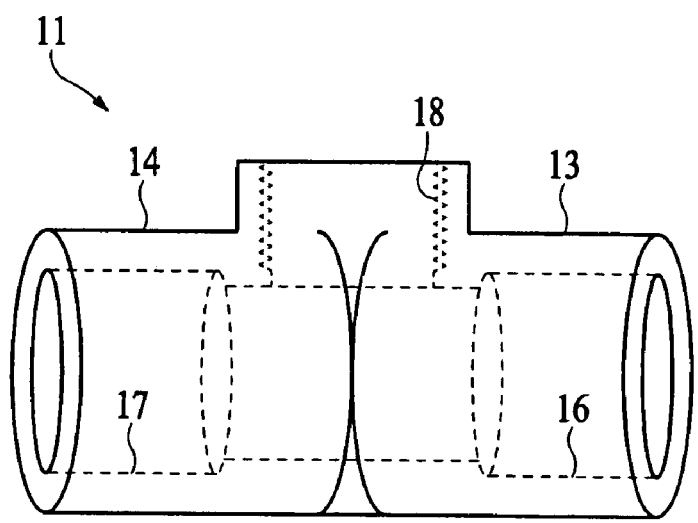
FIG. 2 shows a side view of the fitting of FIG. 1 showing the top-central threaded connection.

Turning to FIGS. 1 and 2, a first embodiment of the invention is illustrated, showing top and side views of a "Y" shaped PVC plumbing fitting 11 with slip fittings for PVC cementing to PVC pipe work. The fitting comprises three tubes 12, 13, 14 which extend generally radially from a central point at which they are connected to each other allowing transmission of fluid from one to the others. The radially outward end of each tube is terminated by a female slip fitting type pipe connection 15, 16, 17. The axes of the three tubes subtend angles of 120° with each other at the centre of the fitting and a further threaded female connection 18 is located at the centre of the fitting and is oriented perpendicularly to the plane of the three tubes 12, 13, 14.

The perpendicular connection 18 is typically used to connect a sprinkler head, a riser tube or a pop-up fitting, in each case with a corresponding male thread.

The length of the three tubes are equal in this embodiment but may also be of varying combinations of length. Fittings may be manufactured with varying tube lengths for different applications. Fittings are also manufactured in various internal diameters corresponding to standard pipe bores, for different flow capacity requirements.

Only one outlet 18 will be centrally located in the top or bottom of the equilateral 'Y' fitting. This central outlet can be plugged or capped if the fitting does not require a sprinkler outlet and in the case where it serves only as a junction connection in the irrigation system network.

Figure 3:
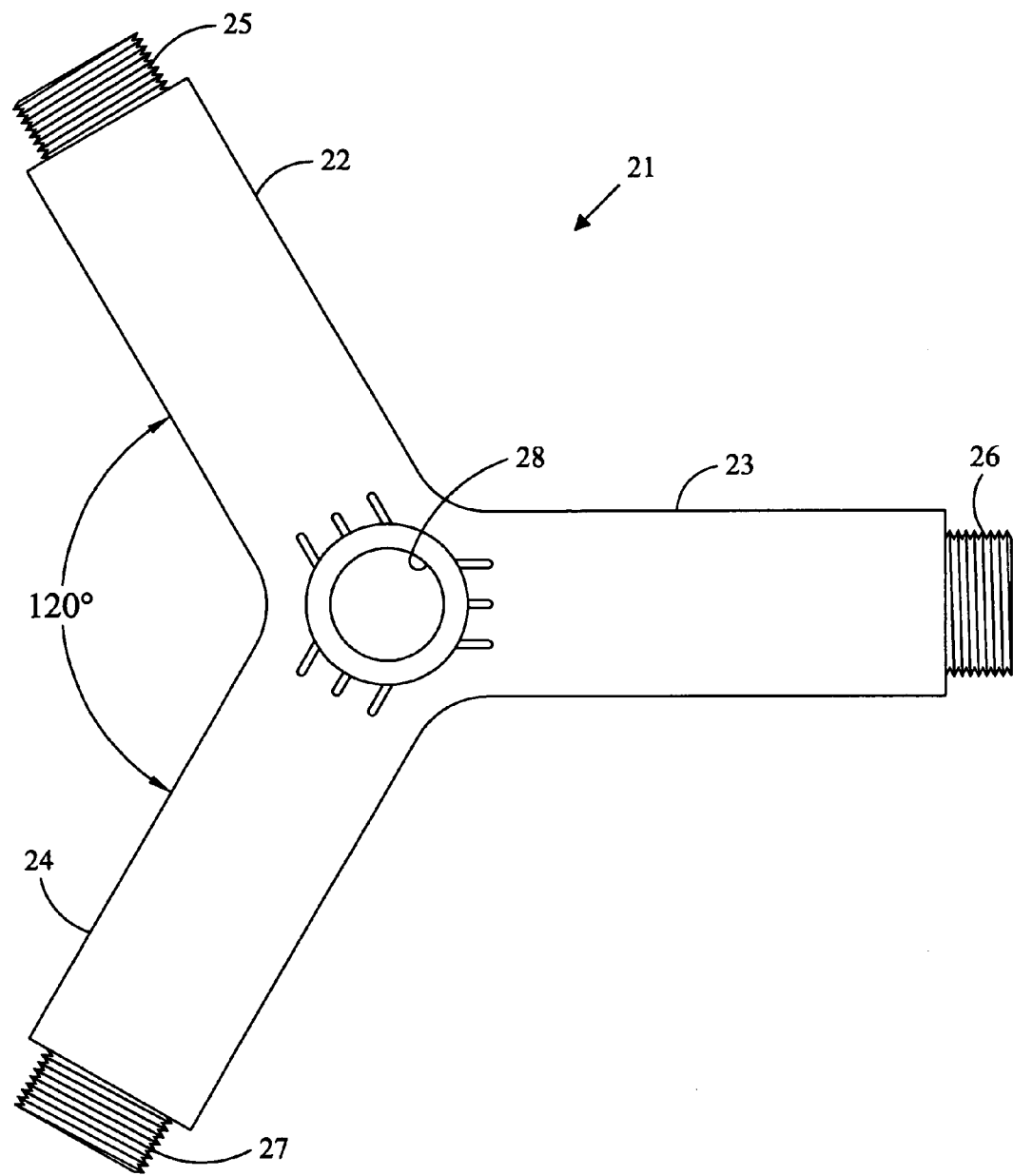
FIG. 3 shows a top view of a second embodiment of the invention with male threads on each of the three tubes.
Figure 4:
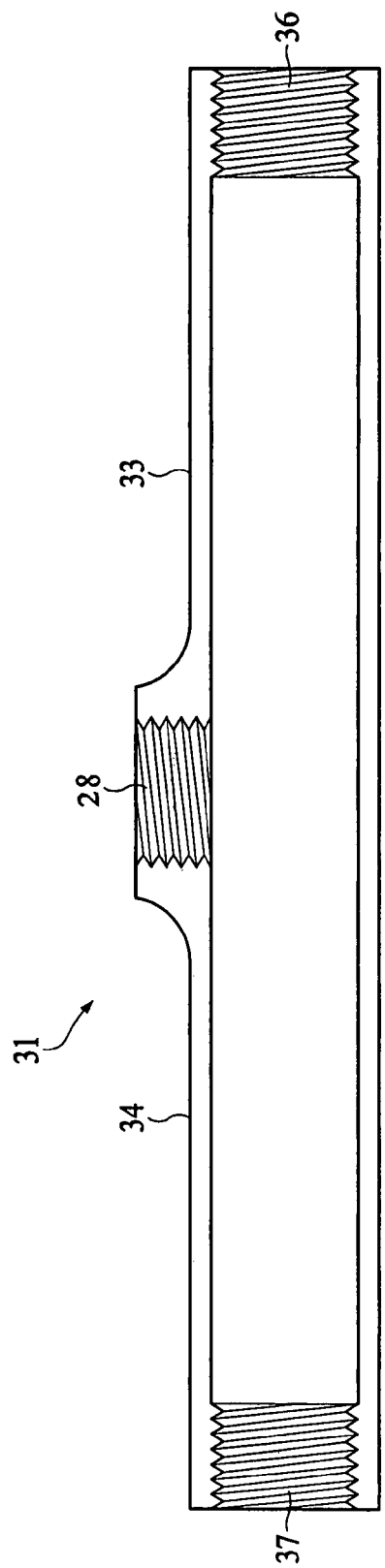
FIG. 4 shows a side view of an embodiment similar to that of FIG. 3 showing the location of the centrally located female threaded connection and in this case female threaded connections on the ends of the three tubes (2 shown)

FIGS. 3 and 4 show top and side views of a second embodiment 21 of the invention with male threaded connections 25, 26, 27 on each of the three radial tubes 22, 23, 24. Optionally female threads 36, 37 can also be used as seen in the side view of a fitting illustrated in FIG. 4 (third tube not illustrated in this view) which is otherwise similar to the fitting of FIG. 3. The fittings illustrated in FIGS. 3 & 4 are also preferably made of PVC and again comprise three tubes which extend generally radially from a central point. The radially outward end of each tube is terminated by threaded type pipe connections. As with the first embodiment the axes of the three tubes subtend angles of 120° with each other at the centre of the fitting and the further threaded female connection 28 is located at the centre of the fitting and is oriented perpendicularly to the plane of the three tubes 22, 23, 24.

Figure 5:
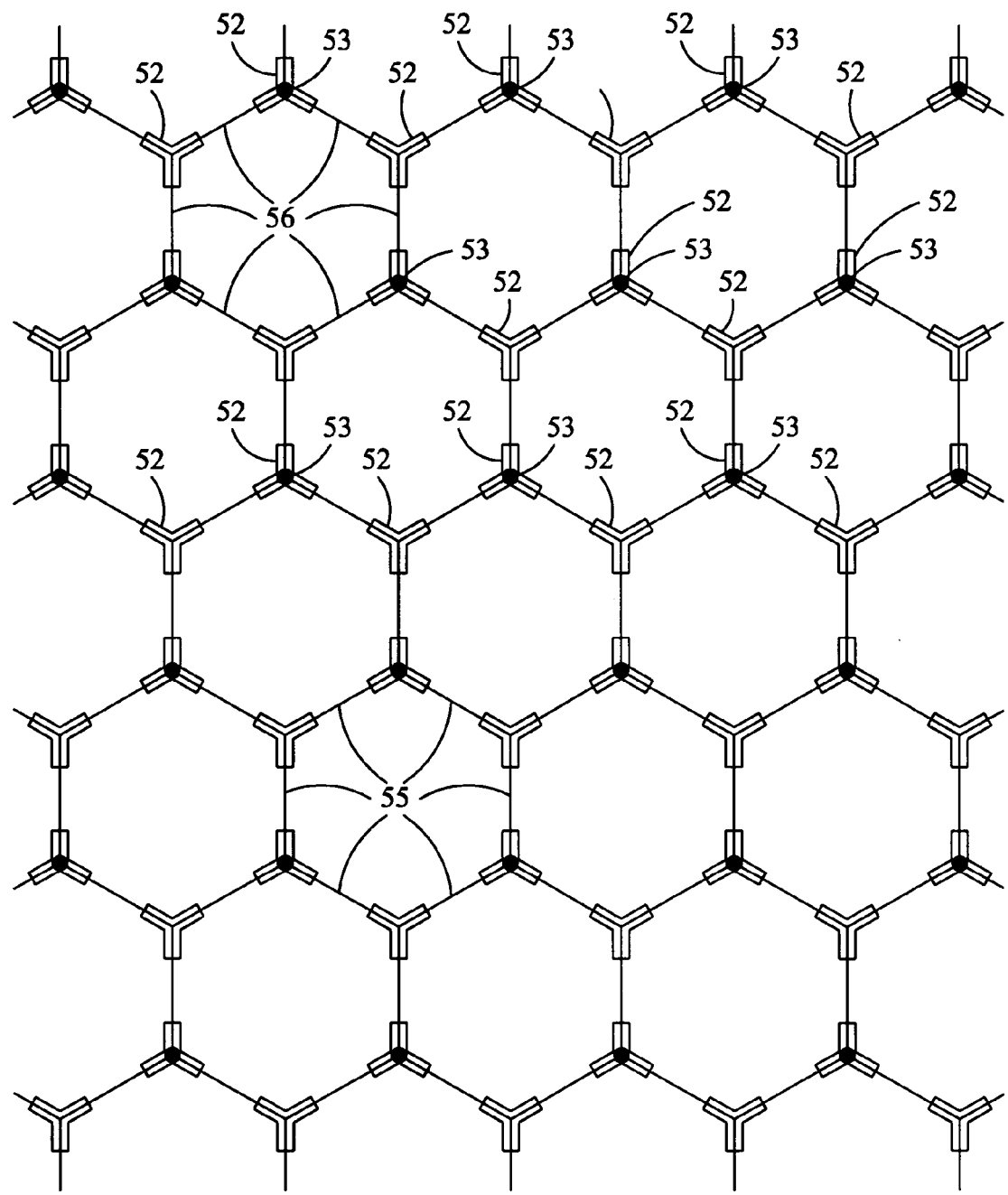
FIG. 5 shows a section of an irrigation pipework design incorporating the use of equalateral 'Y' fittings to supply the sprinklers indicated as black dots.

Referring to FIG. 5 a section of an irrigation pipework design 41 is illustrated incorporating the use of equalateral 'Y' fittings 52 to supply the sprinklers 53 indicated as black dots at every second intersection. This design provides an irrigation system comprising a network of pipes connected by "Y" shaped fittings 52 to form a hexagonal network pattern in which each pipe 56 is substantially equal in length and, in combination with the respective legs of the "Y" shaped fittings to which it is connected forms one side in a hexagonal shaped pipe formation 55.

As illustrated in FIG. 5, preferably a sprinkler head 53 is be fitted to every second "Y" shaped fitting in each hexagonal formation such that each hexagonal formation has sprinkler heads 53 on three non-adjacent corners. However, other configurations are also possible and sprinklers might be placed on every corner for example.

Figure 6:
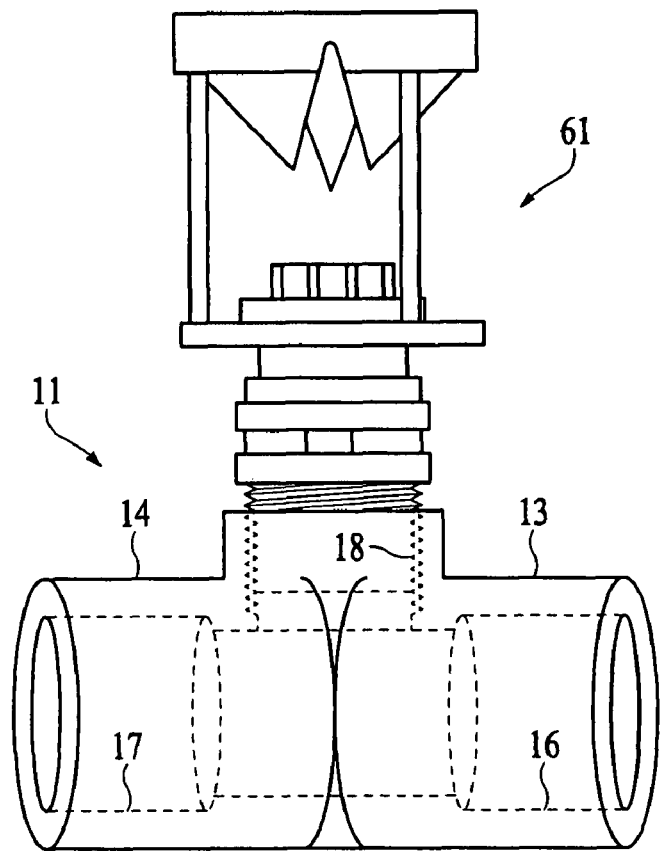
FIG. 6 shows a side view of the fitting shown in FIGS. 1 and 2 with a sprinkler head attached to the upper connection.
Figure 7:
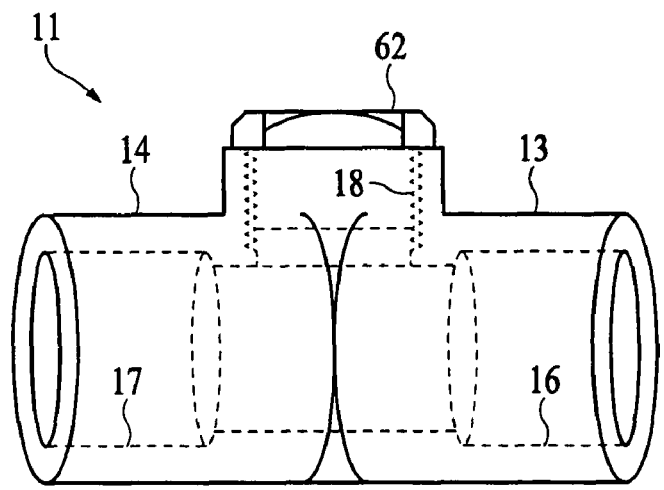
FIG. 7 shows a side view of the fitting shown in FIGS. 1 and 2 with a plug fitted to the upper connection.

Preferably the watering outlets are sprinkler heads either directly connected to the "Y" shaped fitting or connected via a riser, or a pop-up fitting. FIG. 6 shows a fitting 11 similar to that shown in FIGS. 1 and 2, with a sprinkler head 61 attached to the upper outlet 18 by way of example, while FIG. 7 shows the same fitting 11 with the upper outlet 18 fitted with a plug 62

Figure 11:
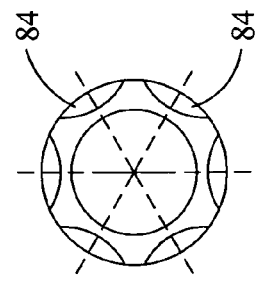
FIG. 11 is an enlarged image of FIG. 8d.
Figure 9:
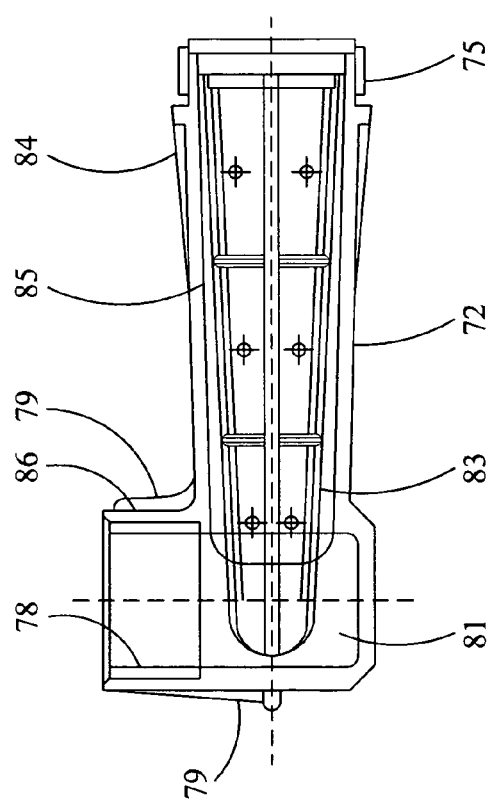
FIG. 9 is an enlarged image of FIG. 8b.
Figure 10:
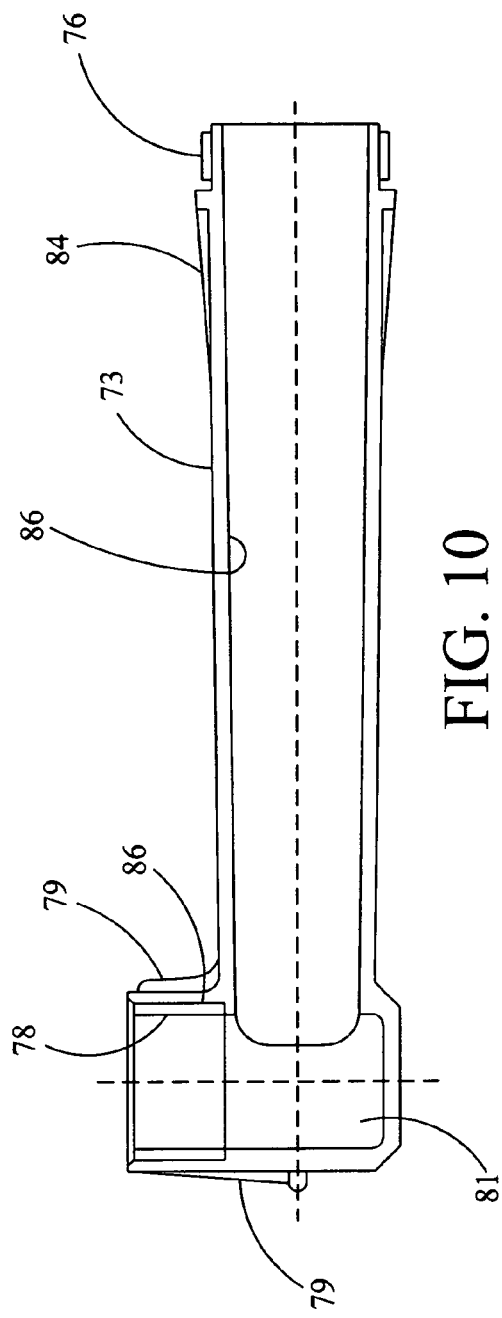
FIG. 10 is an enlarged image of FIG. 8c.

Referring to FIG. 8, a particularly preferred embodiment of the invention is shown in the top view in FIG. 8a, while FIG. 8b and FIG. 9 show a partial sectional side view through a first tube 72 of the fitting 71, FIG. 8c and FIG. 10 show a partial sectional side view through a second tube 73 of the fitting 71 and FIG. 8d and FIG. 11 show a view through section line A-A' at an end of one tube of the fitting 71. The first tube 72 (see FIGS. 8a, 8b and 9) is shorter than the other two tubes 73, 74 and is intended to be an inlet tube, particularly when the fitting is fitted to the end of a flexible hose, in which case the arrow 82, shows the preferred water flow direction into the fitting. The first tube 72 is designed to incorporate an optional removable filter element 83 to minimise clogging of fine jets in sprinkler heads attached to the fitting via the upper outlet 78 (ie. in similar fashion to the sprinkler head 61 in FIG. 6). The filter element 83 may be omitted when the fitting is incorporated into "honeycomb" networks of the type shown in FIG. 5 as in such installations, water may flow in through more than one tube 72, 73, 74 depending on the location of the fitting in the network and depending on other load factors (which may vary over time).

The bore 85 is slightly tapered inwardly for ease of moulding, and communicates with a central chamber 81 under the upper connection 78, with which the central chamber also communicates, such that water flowing in through tube 72 can flow into the central chamber 81 and then out through the upper connection 78.

The second tube 73 (see FIGS. 8a, 8c and 10) extends at an angle of 120° to the first tube. The third tube 74 (see FIG. 8a) is identical to the second tube 73 and extends at an angle of 120° to each of the first and second tubes. The second tube 73 has an internal bore 86 which is also slightly tapered inwardly for ease of manufacture. The bore 86 also communicates with the central chamber 81. In use, when the fitting 71 is attached to a flexible hose and a sprinkler head is fitted to connection 78, the second and third tubes 73, 74 will be closed at their ends (as described below), and will fill with water in use, increasing the lateral stability of the fitting against vibration caused by motion of the sprinkler head. The first tube 72, although shorter, and therefore having less mass, even when filled with water, is stabilised by the hose to which it is attached, such that the fitting achieves good stability in all directions. When the fitting 71 is used in a network, most of the fittings in the network will be connected to pipes on three sides and stability is less of an issue.

The central connection 78 is provided with webs 79 around its periphery which strengthen the base 86 and ensure good material flow to the associated internal thread of connection 78 during manufacture.

The outer end of each tube 72, 73, 74 includes a threaded male connection 75, 76, 77 which permits connection of the fitting 71 to pipes or other fittings. These threads will preferably be standard sized plumbing fitting threads and permit connection of pipe couplers, or garden hose fitting such as snap-on hose connectors. If pipe or hose connections are not required on the second and third tubes 73, 74 the threaded connections 76, 77 may be fitted with a threaded cap (not shown) to close off these tubes.

The outer ends of each of the tubes 72, 73, 74 are each provided with a knurled section (see FIGS. 8a, 8d and 11) which assists the user to grip the tube when screwing or unscrewing fittings to the threaded connections 75, 76, 77.

Preferred embodiments of the invention enable the uniform distribution and flow of water from one fitting or outlet to another while causing minimal pressure loss through each fitting in the system. This fitting is not limited to use as an outlet fitting, and can also be part of a distribution network providing a delivery path to an adjoining identical fitting connected to an outlet.

The provision of an equilaterally 'Y' shaped fitting naturally associates itself to a triangular spacing design naturally forming a 'honeycomb' pattern with the pipework delivering water to one or several sprinkler outlets within the network. Additional advantages arise with a network of "Y" shaped fittings because there is only a 60° change in direction of water flow as it travels through the fitting, as compared with a 90° change in direction in the case of a tee or elbow fitting.

Pipe diameters used within a honeycomb design utilising 'Y' fittings can also be reduced significantly as each sprinkler outlet is supplied by three pipes instead of two or one. Irrigation designs will require careful calculation to determine initial water supply into the network but this will then efficiently disperse the water evenly through the honeycomb network.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An irrigation system comprising:
    a plurality of circular pipes;
    a plurality of plumbing fittings each having three legs extending in a "Y" shape, the "Y" shape having an angle of 120 degrees between each of its three legs, the pipes being connected to the legs of the plumbing fittings to form a network in which each pipe, in combination with legs of connected plumbing fittings, forms one side in a hexagonal shaped pipe network formation, all of the sides of each hexagonal shaped pipe network formation being of substantially equal length, the central axes in a flow direction of each of the pipes of the hexagonal shaped pipe network formation located in a common plane with one another, and
    watering outlets fitted to alternate plumbing fittings.

2. The irrigation system as claimed in claim 1, wherein the watering outlets are sprinkler heads.

3. The irrigation system as claimed in claim 2, wherein the sprinkler heads are directly connected to the plumbing fittings.

4. The irrigation system as claimed in claim 2, wherein the sprinkler heads are connected to the plumbing fittings via risers or pop-up fittings.

5. An irrigation system comprising:
    a plurality of circular pipes;
    a plurality of plumbing fittings each having three legs extending in a "Y" shape, the "Y" shape having an angle of 120 degrees between each of its three legs, the pipes being connected to the legs of the plumbing fittings to form a network in which each pipe, in combination with legs of plumbing fittings connected at either end of the respective pipe, forms one side in a hexagonal shaped pipe network formation, all of the sides of each hexagonal shaped pipe network formation being of substantially equal length, the central axes in a flow direction of each of the pipes of the hexagonal shaped pipe network formation located in a common plane with one another, and
    watering outlets fitted to each plumbing fitting.

* * * * *

UNITED STATES PATENT AND TRADEMARK OFFICE
CERTIFICATE OF CORRECTION

| | | Page 1 of 1 |
|---|---|---|
| PATENT NO. | : 7,896,261 B2 | |
| APPLICATION NO. | : 10/788051 | |
| DATED | : March 1, 2011 | |
| INVENTOR(S) | : Tony Holmes | |

It is certified that error appears in the above-identified patent and that said Letters Patent is hereby corrected as shown below:

Col. 1, Line 67

Change: "connecting means" to read: --connectors--.

Signed and Sealed this
Sixth Day of March, 2012

David J. Kappos
*Director of the United States Patent and Trademark Office*